United States Patent
Son et al.

(10) Patent No.: US 7,619,964 B2
(45) Date of Patent: Nov. 17, 2009

(54) HIGH DOPPLER CHANNEL ESTIMATION FOR OFD MULTIPLE ANTENNA SYSTEMS

(75) Inventors: Jae H Son, Dallas, TX (US); Jan C Olivier, Irving, TX (US); Victor Stolpman, Dallas, TX (US); Tony Reid, Plano, TX (US)

(73) Assignee: Nokia Corporation, Espoo (FI)

( * ) Notice: Subject to any disclaimer, the term of this patent is extended or adjusted under 35 U.S.C. 154(b) by 604 days.

(21) Appl. No.: 10/888,136

(22) Filed: Jul. 8, 2004

(65) Prior Publication Data

US 2006/0017613 A1 Jan. 26, 2006

(51) Int. Cl.
*H04J 11/00* (2006.01)

(52) U.S. Cl. .................. 370/210; 370/310; 370/334; 375/346; 455/218

(58) Field of Classification Search ............ 370/203; 455/218
See application file for complete search history.

(56) References Cited

U.S. PATENT DOCUMENTS

| | | | | |
|---|---|---|---|---|
| 4,740,967 A * | 4/1988 | Georgalis | ............ | 370/295 |
| 4,987,569 A * | 1/1991 | Ling et al. | ............ | 370/292 |
| 6,377,555 B1 * | 4/2002 | Lee et al. | ............ | 370/252 |
| 6,628,726 B1 * | 9/2003 | Breiling | ............ | 375/260 |
| 6,816,453 B1 * | 11/2004 | Sakamoto | ............ | 370/210 |
| 7,139,534 B2 * | 11/2006 | Tanabe et al. | ............ | 455/108 |
| 7,173,961 B2 * | 2/2007 | Vadde | ............ | 375/219 |
| 2002/0154705 A1 * | 10/2002 | Walton et al. | ............ | 375/267 |
| 2002/0191630 A1 * | 12/2002 | Jacobsen | ............ | 370/430 |
| 2004/0018018 A1 * | 1/2004 | Izadpanah | ............ | 398/77 |
| 2004/0081263 A1 * | 4/2004 | Lee et al. | ............ | 375/347 |
| 2004/0170228 A1 * | 9/2004 | Vadde | ............ | 375/260 |
| 2005/0047322 A1 * | 3/2005 | Sondur | ............ | 370/203 |
| 2006/0140249 A1 * | 6/2006 | Kohno | ............ | 375/130 |
| 2006/0239177 A1 * | 10/2006 | Mazet et al. | ............ | 370/208 |
| 2007/0053473 A1 * | 3/2007 | Palin | ............ | 375/355 |

FOREIGN PATENT DOCUMENTS

CN 1398119 A 2/2003

OTHER PUBLICATIONS

Lam et al. "Synchronous Optical Fiber Code-Division Multiple-Access Networks Using Walsh Codes" IEEE $7^{th}$ Int. Symp. on Spread-Spectrum Tech. & Appl., Prague, Czech Republic, Sep. 2-5, 2002, pp. 425-429.*
Yi Ma et al., "Pilot Embedded Space-Time Block Coded OFDM in Unknown Multipath Fading Channel", Vehicular Technology Conference, 2004 VTC 2004 IEEE 59th, Publication date May 17-19, 2004, vol. 1, pp. 450-454.

(Continued)

*Primary Examiner*—Chi H. Pham
*Assistant Examiner*—Shick Hom
(74) *Attorney, Agent, or Firm*—Harrington & Smith, PC

(57) ABSTRACT

Fast fading in cellular systems causes time variation of the Channel Impulse Response (CIR) resulting in significant performance degradation that is reduced by adding a pulse train to the transmitted data symbols and estimating the CIR by averaging the symbols as they vary from one OFDM symbol to another within the physical data frame (or packet).

29 Claims, 7 Drawing Sheets

OTHER PUBLICATIONS

Jun Tao et al., "MIMO FIR Channel Estimation: A First-Order Statistical Method", Proceedings of the 2003 International Conference on Publication date Dec. 14-17, 2003, vol. 2, pp. 1437-1440.

Balasubramanian S et al,. "Pilot Embedding for Channel Estimation and Tracking in OFDM Systems", 2004 GLOBECOM 04 IEEE, Publication Date Dec. 3, 2004, vol. 2, pp. 1244-1248.

Haidong Zhu et al., "Pilot Embedding for Joint Channel Estimation and Data Detection in MIMO Communication Systems" Communications Letters IEEE, Publication date Jan. 2003, vol. 7, pp. 30-32.

Jun Tao et al., "A First-Order Statistical Method for Time-Variant MIMO Channel Estimation", 2004 IEEE $5^{th}$ Workshop on Signal Processing Advances in Wireless Communications, pp. 209-212.

Jitendra K. Tugnati et al,. "On Channel Estimation Using Superimposed Training and First-Order Statistics", IEEE Communications Letters, vol. 7, No. 9, Sep. 2003, pp. 413-415.

"Pilots for Joint Channel Estimation in Multi-user OFDM Mobile Radio Systems", Ioannis Maniatis, et al., IEEE $7^{th}$ Int. Symp. on Spread-Spectrum Tech. & Appl., Sep. 2002, pp. 44-48.

"A spreading scheme including combined spectral and temporal spreading for OFDM systems with joint detection", Alexandros Skiavos et al., IEEE, 2002, pp. 575-579.

Zhou. G.T., "A First-Order Statistical Method for Channel Estimation", IEEE Trans. Signal Proc. Letters, vol. 10, No. 3, Mar. 2003, pp. 57-60.

Mccormick, A.C.et al., "A Comparison of Convolutional and Walsh Coding in OFDM Wireless LAN Systems", Sep. 18-21, 2000, pp. 166-169, Personal, Indoor and Mobile Radio Communications, PIMRC 2000, The $11^{th}$ IEEE International Symposium on vol. 1.

* cited by examiner

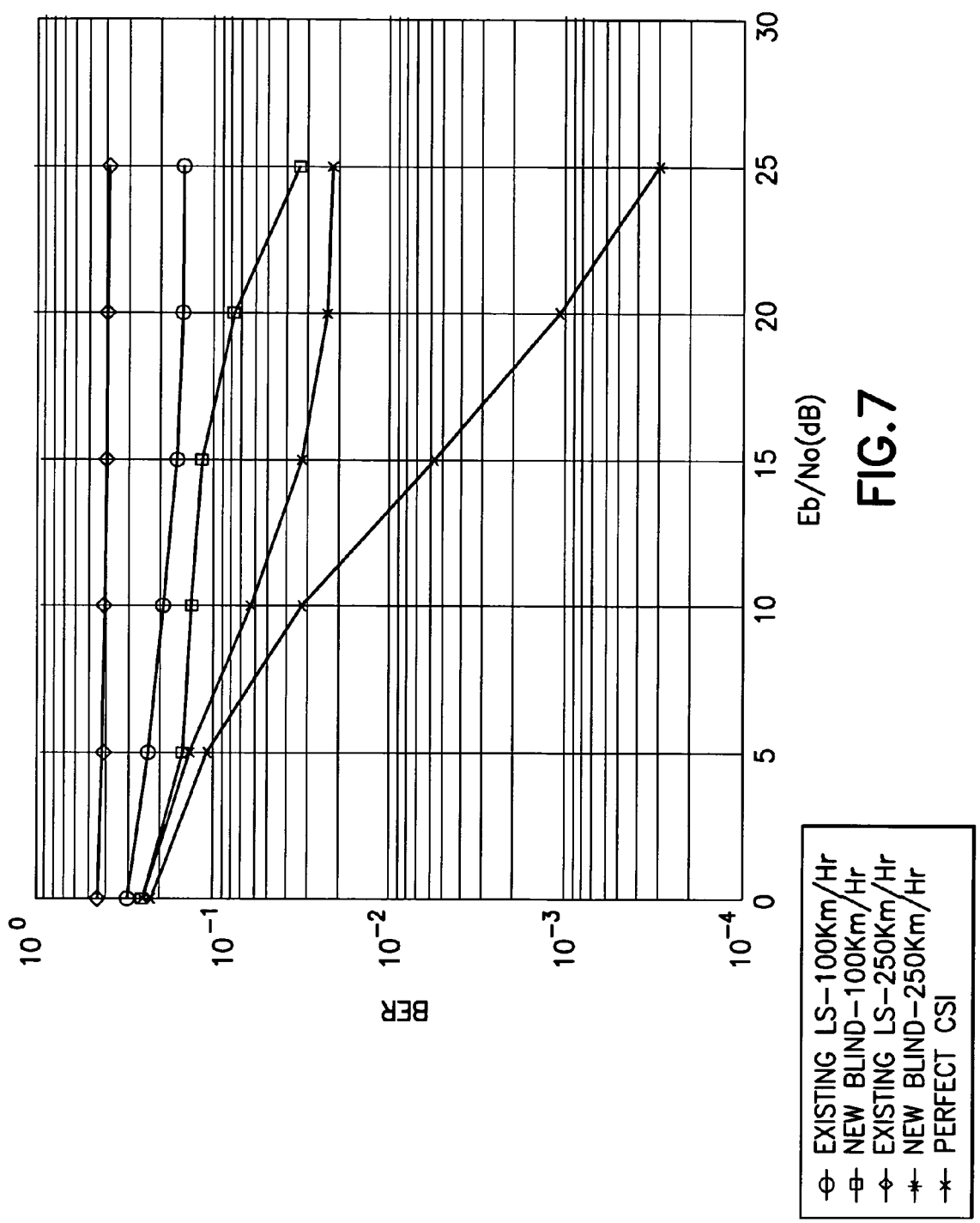

HIGH DOPPLER CHANNEL ESTIMATION FOR OFD MULTIPLE ANTENNA SYSTEMS

TECHNICAL FIELD

The invention is in the field of the channel estimation of multiple-antenna systems.

BACKGROUND

The channel estimation task for multi-antenna OFDM systems in a high mobile environment is a challenging one. Due to the rapid change of the channel environment, frequent update of the channel estimation is required for reliable data detection. For future OFDM systems, the length of a physical data packet and of an OFDM symbol will be increased such that one-time channel estimation through training sequences won't adequately represent the channel variation influenced by the whole packet under even a moderate mobile channel environment.

In the field of Orthogonal Frequency Division Multiplexing (OFDM) systems, the conventional multi-antenna OFDM channel estimation requires the attachment of a known training sequence to the physical data packet before its transmission, thus reducing overall bandwidth efficiency. Also, the conventional multi-antenna channel estimation requires complex computation, usually involving a computationally intense matrix inversion calculation. In a high Doppler channel environment where the channel changes rapidly, it means frequent updates of the channel estimation for reliable data detection, consequently incurring further loss of bandwidth and increase of computational loads for the conventional Multiple Input Multiple Output (MIMO) channel estimation.

This issue will be more critical for future OFDM systems such as 4G where the size of an OFDM symbol and a physical data packet is expected to be long. (For example, an OFDM symbol with 2048 subcarriers and a physical data packet near 24 OFDM symbols long are expected.) Therefore, computationally simple yet effective channel estimation for multi-antenna OFDM system has been the goal of many research activities.

Fast fading caused by a fast moving user terminal in cellular systems causes time variation of the Channel Impulse Response (CIR) over the physical OFDM frame. That variation in turn causes detection errors when using the FT in the receiver. A frame typically consists of a large number of OFDM symbols for the future 4G system, but there is only one pilot preamble to the frame used for synchronization and channel estimation. As the symbol number in the frame advances, the CIR varies and the CIR obtained from the preamble may become inaccurate. The higher the maximum Doppler frequency is, the more rapidly outdated the CIR obtained from the pilot preamble will be.

Recently, a similar channel estimation method has been proposed to place pilot symbols every M data symbols, thereby enabling a re-estimation of the CIR (G. Zhou, et al. "A First Order Statistical Method for Channel Estimation", IEEE Trans. Signal Proc. Letters, Vol. 10, No. 3, March 2003, pp. 57-60. However, no further investigation on the multiple antenna OFDM system has been provided. In addition, no impulse train design issue has been mentioned.

Another proposal (J. C. Olivier, Derivative Equalization, May 2002, 4G Project Database) was to use a so-called derivative equalizer, a device that equalizes the time derivative of the CIR, rendering the frame time invariant. However, the equalizer is linear and causes noise enhancement.

SUMMARY OF THE INVENTION

The invention relates to a wireless communication system that estimates the channel parameters throughout the duration of the transmitted symbols by adding a pulse train and subtracting the pulse train in the receiver.

A feature of the invention is the use of bipolar pulse trains and the avoidance of DC bias on the signals.

Another feature of the invention is the use of M separate impulse sequences for M transmit antennas.

Another feature of the invention is that the channel estimation is found by a time average over a set of data samples, each sample being multiplied by the appropriate sign for that sample.

Yet another feature of the invention is a time-domain receiver in which the estimated input signal vector is convolved with the impulse train to obtain the impulse train estimate contained within the received signal and the estimate is converted to the frequency domain through a FT that is used in the (frequency domain) equalizer to obtain the estimated symbol.

Yet another feature of the invention is a frequency-domain receiver in which the product of the FT of the estimated channel vector and the FT of the impulse train is convolved with the FT of the received signal to obtain the estimate that is used in the (frequency domain) equalizer to obtain the estimated symbol.

BRIEF DESCRIPTION OF THE DRAWINGS

FIG. 7 shows bit error rates for various parameters.

DETAILED DESCRIPTION

Figure 1:
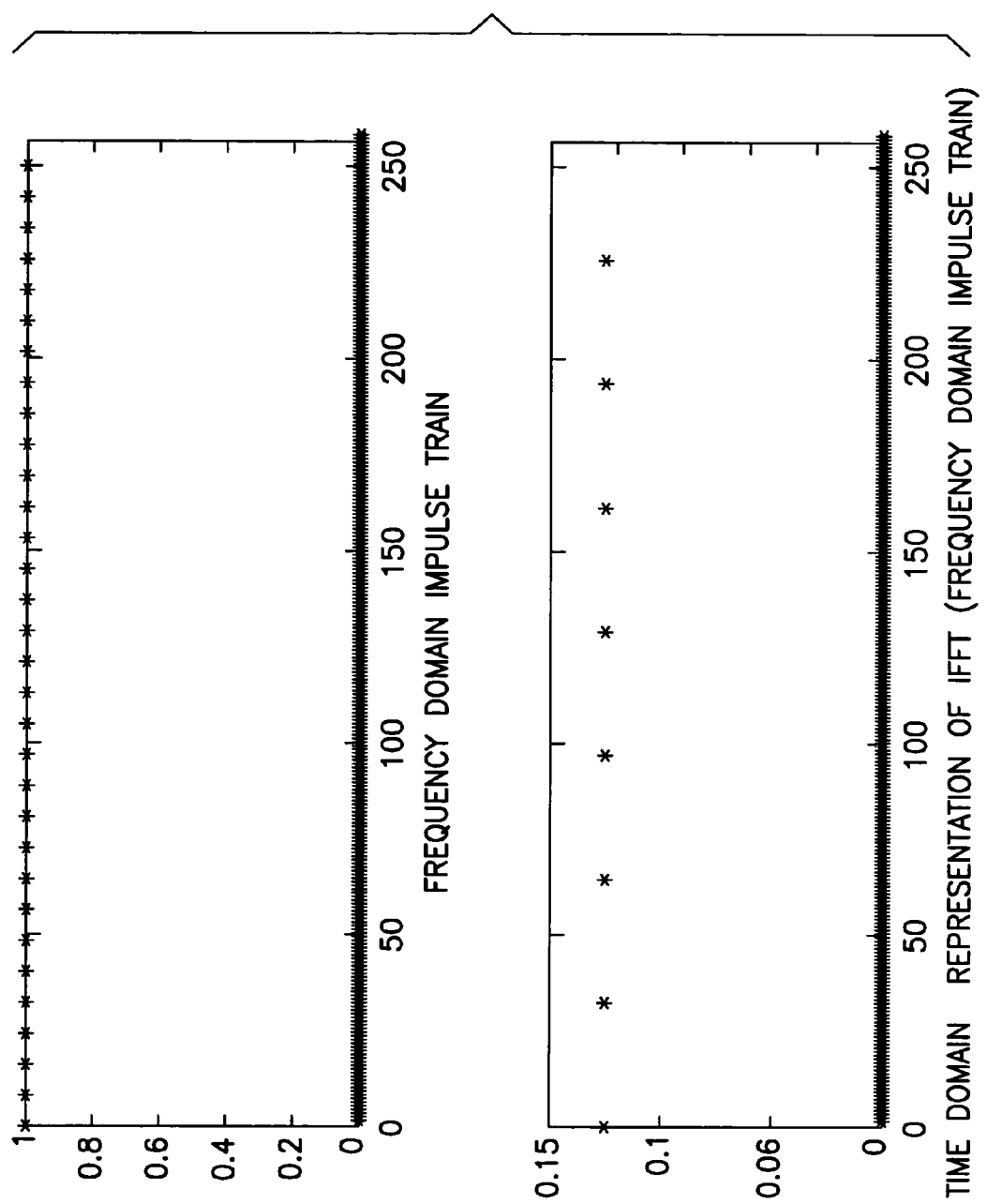
FIG. 1 shows the FD and TD presentations of a set of complex numbers that might be used in the invention.

According to the invention, a novel channel estimator for the OFDM system incorporates a more sophisticated impulse train design at the transmitter. The proposed channel estimator computes an average value of close-to periodic samples of received signals added by zero-mean orthogonal impulse trains (such as Walsh codes) to obtain a CIR estimate under the zero-mean data and zero-mean noise assumption. The proposed estimator requires simple computation and modest channel tracking capability under high Doppler channel environment without any bandwidth penalty since the pulse sequence is added to the data.

The proposed channel estimation is simple since the core computation requires multiple averaging operations. The proposed channel estimation is bandwidth efficient since the impulse train is added to the data and the data are recovered, thus incurring no loss of bandwidth compared with replacing the data. The proposed channel estimation is effective since the simulation results show the performance improvement over the conventional channel estimation under the high mobile environment.

This channel estimator can be well-suited for a long physical data packet system such as found in a future high data rate wireless system in which the OFDM symbol can reach 2K subcarriers. Where we have multiple transmit antennas, say M, and say 1 Rx antenna, we use M Walsh sequences to separate the M channels, and each MIMO CIR is estimated for each symbol. This argument can be extended further for the M Tx antenna and N Rx antenna case.

In OFDM systems, the peak to average ratio in the TD (Time Domain) is large. An advantageous feature of the invention is that we may select the amplitude of the impulse train such that the ratio is not affected significantly. Also, the proposed Walsh impulse train has a zero mean property eliminating any DC bias on transmitted signals, contrary to the Kronecker delta impulse train [Zhou, above]. Overall, it has been observed through simulation that the more data samples per symbol used and the bigger the impulse amplitude is, the better the CIR estimate becomes. We will show that good performance is achieved with as few as 30 impulses per estimation with moderate addition of impulse train signal power.

Conventional OFDM Transmission and Detection Over a Dispersive Channel

Here, we briefly present the essential OFDM modulation and detection procedure. We define an OFDM symbol, Z, as a time domain vector of N samples after an inverse FFT (denoted by $F^{-1}$) has been applied to the data vector, D, and cyclic redundancy, c, has been appended in the time domain:

$$z = c + F^{-1}\{D\}. \quad (1)$$

z is transmitted over a channel with its CIR, h, and at the receiver it is received as y in the presence of AWGN noise, n, as:

$$y = h*z + n. \quad (2)$$

where * denotes convolution. Detection can be performed after the estimation of h, the removal of cyclic redundancy, and the FFT (denoted by F) operation to y since $F\{z-c\} = \hat{D} \approx D$. Use of the inverse FFT and the FFT is permitted as the channel is circular due to the addition of the cyclic redundancy in the TD.

B. Channel Estimation

We recognize that the $F^{-1}$ of a periodic circular array of complex numbers given by $P = [a, 0, \ldots, a, 0, \ldots, a, 0, \ldots]$ is also an array of the same form but with a different number of zeros. For example, the Frequency Domain (FD) and Time Domain (TD) presentations of such an array are shown in FIG. 1 for an array of 256 elements with a=1 and 7 zeros. Hence, if we add the impulse value of a to the modulation constellation of every Q data samples in the FD, then mathematically we may write $$z = F^{-1}\{D + P\}. \quad (3)$$

$$P = [a, \gamma_1, \ldots, \gamma_{Q-1}, a, \gamma_1, \ldots, \gamma_{Q-1}, a, \ldots] \quad (4)$$

$$\gamma_i = 0, \forall i \quad (5)$$

and therefore we receive $$y = h*F^{-1}\{D\} + h*F^{-1}\{P\} + n. \quad (6)$$

But $F^{-1}\{P\} = w$ where the form of w is also given by $[c, 0, \ldots, c, 0, \ldots, c, 0, \ldots]$ with a different number of zeros, say R−1. Thus, $$y = h*F^{-1}\{D\} + h*w + n. \quad (7)$$

Let us now compute the expectation value of y(1), denoted by E[y(1)] but defined as a time average of every R samples $$E[y(1)] \approx \frac{1}{\kappa} \sum_{j=0}^{\kappa-1} y(1 + jR) \quad (8)$$

where κ denotes the length of the OFDM symbol divided by R. Since h*w is periodic with period R and data $F^{-1}\{D\}$ and noise n have zero mean, we thus find that:

$$E[y(1)] \approx \frac{1}{\kappa} \sum_{j=0}^{\kappa-1} y(1 + jR) \approx c \cdot h(1) \quad (9)$$

In general, we may find $$E[y(m)] \approx c*h(m) \forall 0 < m < R \quad (10)$$

And E[y(m)] may be computed as a time average, i.e.

$$E[y(m)] \approx \frac{1}{\kappa} \sum_{j=0}^{\kappa-1} y(m + jR) \quad (11)$$

Note that if there is an integer relationship between the OFDM size N and R, then κ is Q.

The only limitation for the above assertion to hold is that R must be greater than the delay spread L of the channel, and the symbol must be long enough so that κ is at least 30 for moderate values of a. Also, the larger we make a, and thus c, the better the estimate of h becomes but the worse the peak to average ratio of the TD signal to be transmitted becomes and more transmitted signal power is allocated to impulse signals over the data symbols.

Impulse Train

It would be undesirable to implement a Kronecker Delta impulse train for a practical application since it could induce a DC bias on the transmitted signal. To eliminate this DC bias term, we propose a bipolar Walsh sequence impulse train. In addition, a Walsh sequence will bring more benefit for multiple antenna systems due to its zero cross correlation property among different Walsh sequences. This implies that the Walsh impulse train of each transmitter antenna can be uniquely recovered by correlating its own Walsh impulse train, thus enabling MIMO channel CIR estimation.

The estimation through Walsh sequence can be similarly obtained with a minor adjustment. Rather than having a periodic impulse train of w(n)

$$w(n) \approx \sum_{q=0}^{q=Q-1} a\delta(n - qR) \quad (12)$$

Now, the sign of impulse train will vary according to the Walsh sequence W(n)

$$w(n) \approx \sum_{q=0}^{q=Q-1} W_q(n) a\delta(n - qR) \quad (13)$$

where $W_q(n) = W(q)$, $qR \leq n \leq (q+1)R - 1$.

The modified channel estimation will be computed as a time average along with a Walsh sequence sign multiplication term, i.e.

$$E[y(m)] \approx \frac{1}{K} \sum_{j=0}^{K-1} y(m+jR) W_j(n) = c \cdot h(m) \; \forall \; 0 < m < R$$

In this example, the CIR h is estimated after receiving one OFDM symbol, so a new CIR estimate is available after receiving each new OFDM symbol. This indicates that the CIR can be updated and tracked over the frame without having additional pilot symbols.

D. Receiver Topology

Two types of receiver may be used with the invention, one in the time domain and another in the frequency domain, based on the location of the impulse train removal and detection method.

Figure 2:
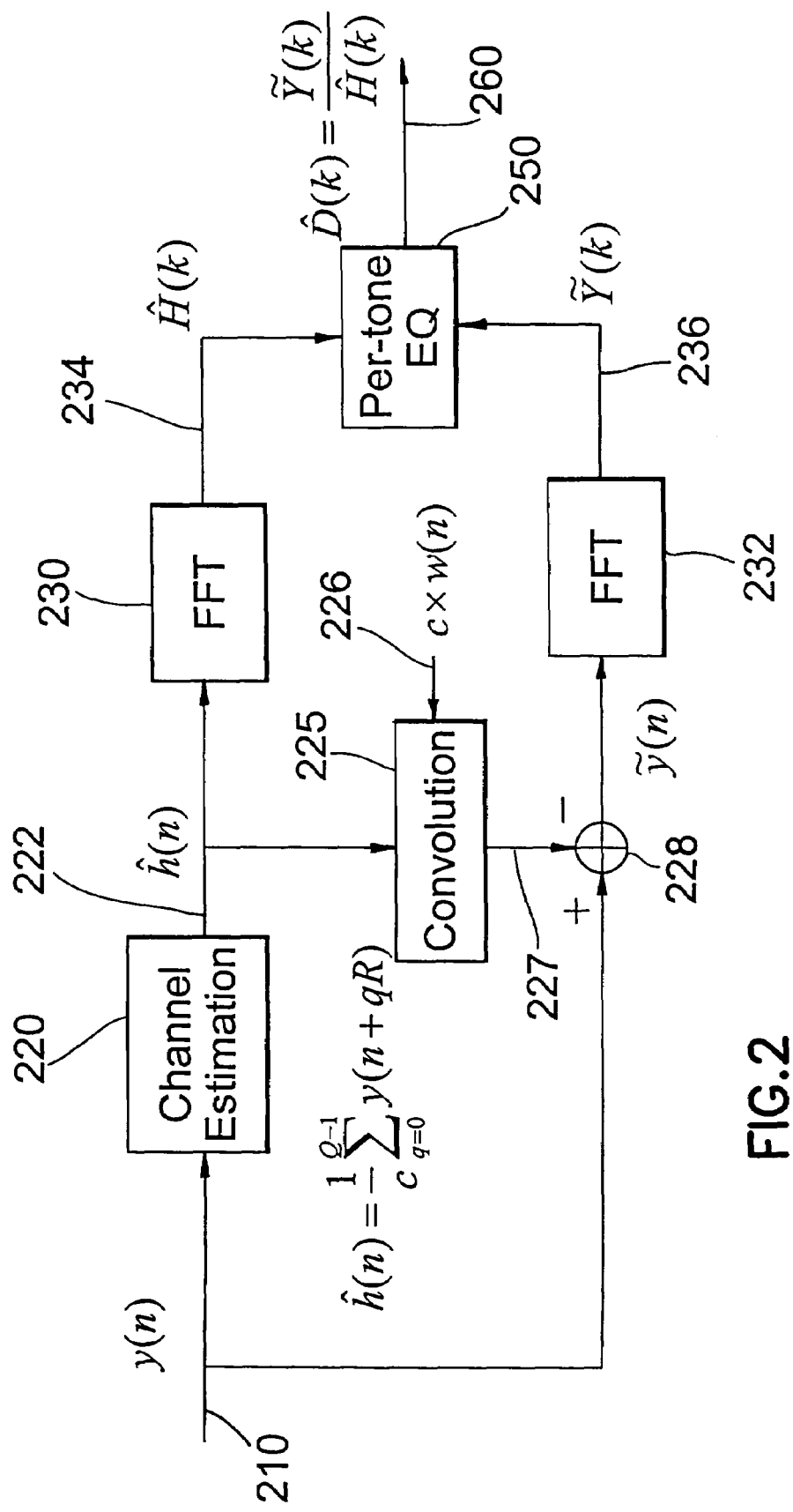
FIG. 2 shows a block diagram of a time-domain receiver.

FIG. 2 shows a block diagram of the time domain approach of the OFDM receiver design. It is assumed here that time synchronization has been achieved at the front end of this receiver design. The received signal y(n) coming in on line 210 will be processed in unit 220 for channel estimation as described previously. The estimating process is a simple average over a sample period, which need not be the entire length of a symbol. The estimated channel function leaves on line 222.

The next step is to extract the impulse train out of the received signal. For this purpose, we will use the channel estimate, ĥ(n), to convolve with the scaled impulse train, c·w(n), to obtain the impulse train estimate embedded in the received signal. The scaled impulse train on line 226 is generated in the receiver in response to parameters that are passed to it or are acquired in a training sequence.

After subtracting (228) out this impulse train influence, we convert the estimated received signal, ỹ(n), into the frequency domain through FFT in unit 232, obtaining Ỹ(k). The channel function h is converted to the frequency domain H in unit 230. A conventional per-tone equalization in unit 250 is performed in the frequency domain with Ĥ(k) to obtain the symbol estimate D̂(k).

The various calculations may be performed in a general purpose computer or in a digital signal processor integrated circuit chip.

Figure 3:
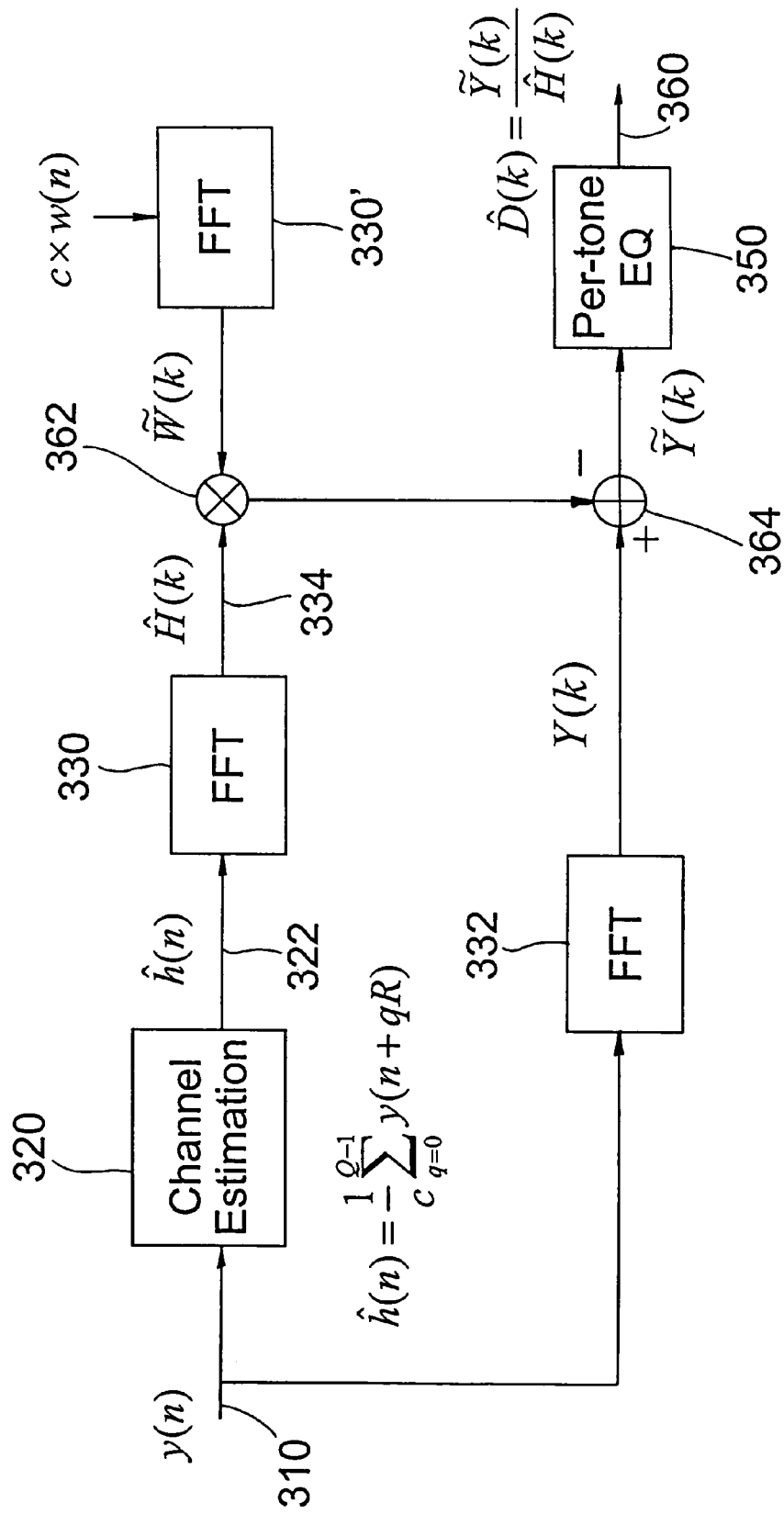
FIG. 3 shows a block diagram of a frequency-domain receiver.

FIG. 3 shows the frequency domain approach of receiver design. Instead of removing the impulse train in the time domain, the impulse train is removed in the frequency domain with the frequency response product of the channel estimate Ĥ(k) and impulse train W̃(k). The usual per-tone equalization is then performed to estimate the data.

The signal enters on line 310 and passes through estimator 320, which produces the estimated channel function h on line 322. The channel function is converted in FFT unit 330. In parallel, the input signal is converted to the frequency domain in unit 332. The estimated impulse signal in the frequency domain is produced by convolution of the channel estimate with the impulse signal (from FFT 330') in convolver 362.

The impulse signal is then removed from the input signal in convolver 364 and the result is equalized in unit 350. The functions shown in this figure may also be carried out in either a general purpose computer or a digital signal processor.

The difference between the time-domain approach and frequency domain approach for tone cancellation may not be significant computationally, but if any further signal processing procedure is pursued jointly, the frequency domain approach could fit nicely for the OFDM system.

The proposed channel estimation can be also used for Multiple Input Multiple Output (MIMO) systems. For MIMO with M transmit antennas, we use a set of M Walsh sequences. Walsh sequences are chosen since they have zero cross-correlation to each other. Here, we assume the transmit antennas are sending each impulse train synchronously, so that one Walsh sequence used by one transmit antenna won't be interfering with other Walsh sequences used by other transmit antennas for the proposed channel estimation process.

Figure 4:
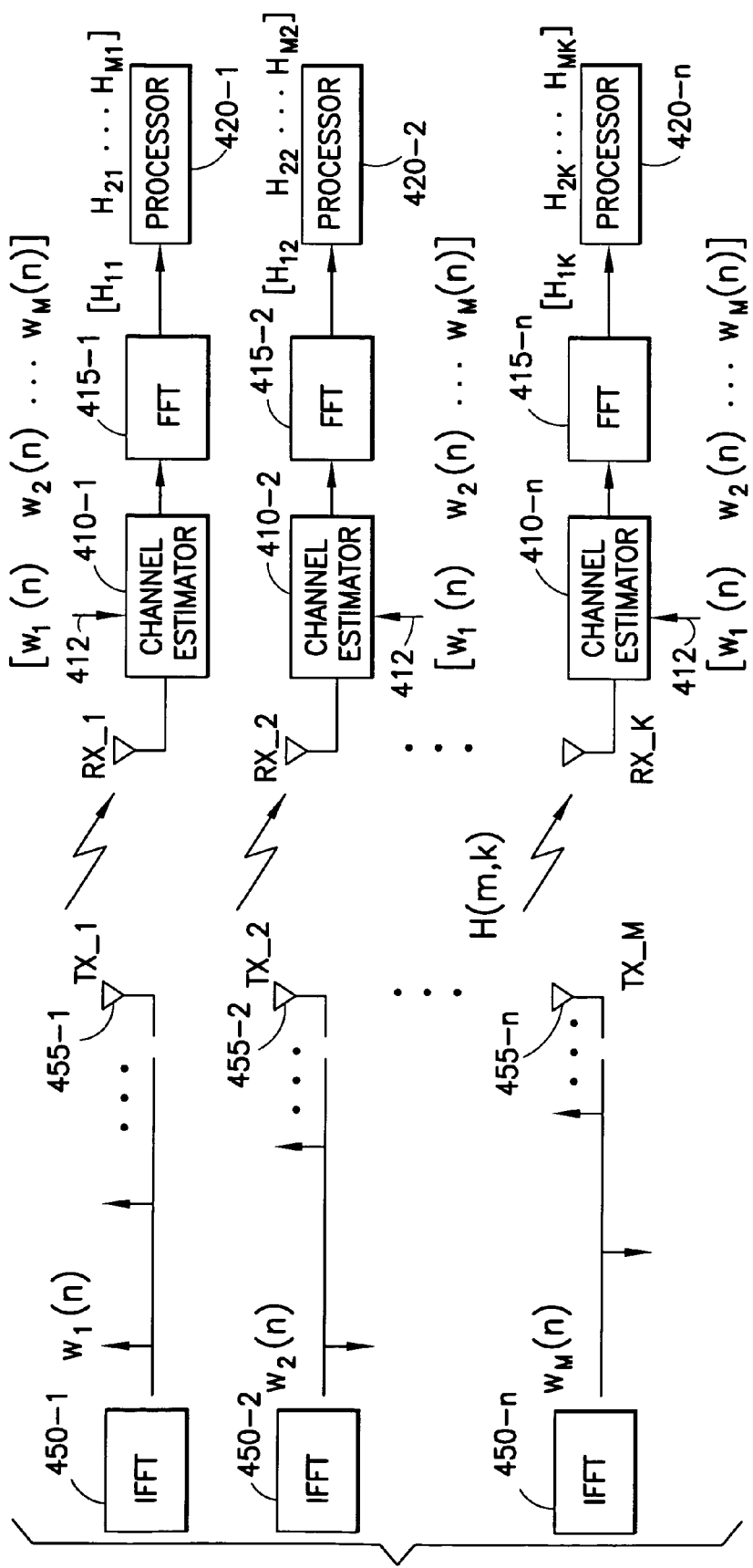
FIG. 4 shows a block diagram of a system for estimating CIR in a multiple antenna system.

FIG. 4 illustrates a simplified block diagram of a multiple system. On the left of the Figure, data come in from a conventional processing system. The data pass through an IFFT 450-1 to 450-n and out transmit antennas 455-1 to 455-n. For illustration, a sample set of synchronous Walsh codes W1 through Wn are shown. The signals pass through channels H(m,k) to receiver antennas Rx-1 to Rx-n.

In the receiver, each channel estimator unit 410-I will cross-correlate the received signal with the Walsh sequence of a desired transmit antenna (shown as entering on lines 412) to obtain the CIR of the desired Tx antenna. This estimation process occurs simultaneously across the set of receiver antennas. The estimated channel parameter is passed through FFT 415-I to generate an estimated frequency domain channel parameter set H11-Hm1. After MIMO channel CIR estimates are available, as described in the previous section, each receiver will subtract out undesirable Walsh impulse train influences.

Either of the approaches shown in FIG. 3 or 4 may be used. Boxes 420-1 to 420-n represent the remaining portions of the receiver system. The received data will be passed to a MIMO symbol detector (such as QRD-M or Reduced-M MIMO symbol detector) along with MIMO channel estimates. For MIMO systems, both frequency domain and time domain receiver architectures can be used for each receiver antenna.

It has been observed through simulation that the error concentrates at subcarrier locations of the impulse train in the frequency domain. It was found out that noise enhancement and the data symbol cancellation are occurring at those subcarrier locations.

To alleviate this problem, we use an additional random timing jittering scheme for the impulse train in the time domain. A random value (positive or negative and a small fraction of the pulse period) is added to the nominal time of the nth pulse. The magnitude of time jitters can be added within +/−3 samples of periodic tone locations.

In this way, the impulse train itself is not periodic and the data error associated with a channel estimate won't cancel the data symbols at those frequency bins. At the same time the noise enhancement will be spread to adjacent subcarriers. There is no change in the overall estimator error, however, through this jittering the estimate error characteristics has are changed to avoid the actual data cancellation and noise enhancement.

Figure 5:
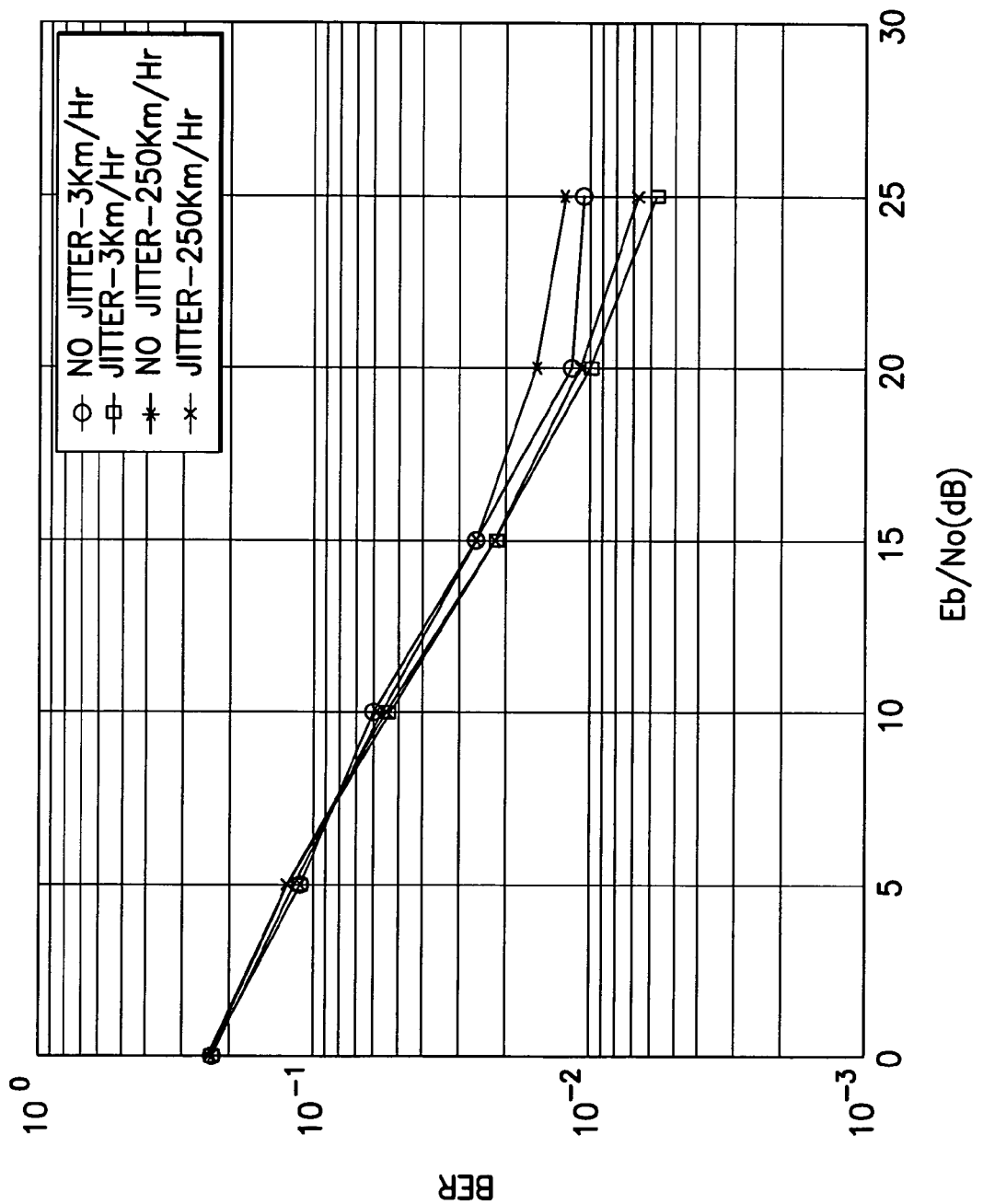
FIG. 5 shows the effect of time jittering of the impulse train.

The performance improvement is shown in FIG. 5 for the SISO QPSK case. FIG. 5 indicates the error floor for the original periodic impulse train while the benefit of time jittering on impulse train can be observed at high SNR.

Figure 6:
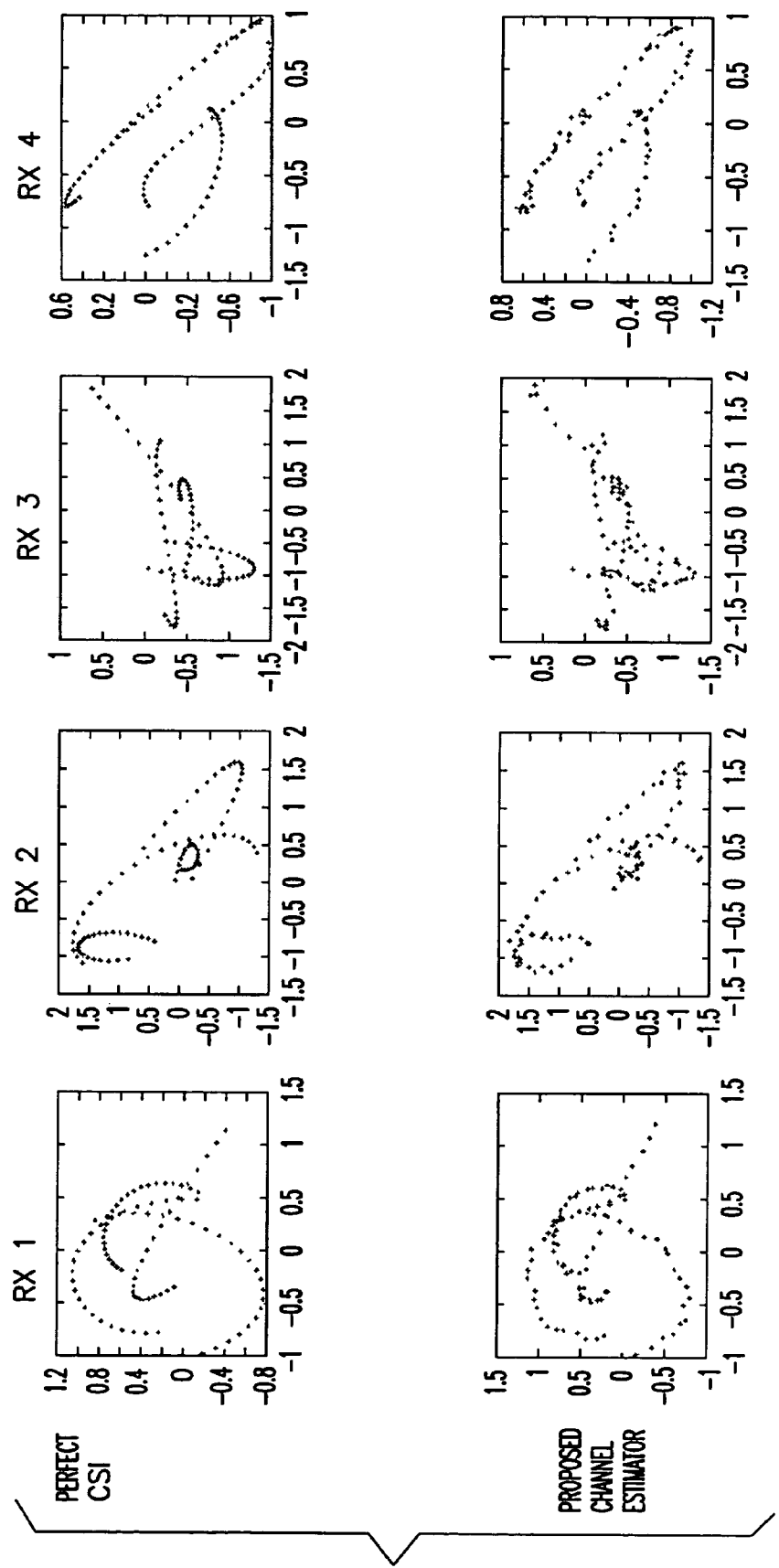
FIG. 6 shows a comparison of exact and estimated results of coefficients.

Several computer simulations were conducted to show the performance of the proposed algorithm according to the invention. FIG. 6 shows the comparison of MIMO CIRs obtained from the proposed channel estimation against true CIRs. The first row of subplots represents true CIRs while the second row of subplots represents the corresponding channel estimations.

The X axis and Y axis of the subplots represent the real axis and imaginary axis to show the complex CIR values. Thirty-two samples per OFDM symbol were used to render the channel estimate. Each dot pattern represents a channel variation of h(t, r; n) where t is a transmitter antenna index, r is a receiver antenna index, and n is a discrete time index. FIG. 6 shows the high Doppler effect on CIR along with the channel tracking capability of the proposed channel.

FIG. 7 shows physical BER curves of the proposed channel estimation against existing channel estimation according to the prior art. The simulation was conducted for 2×2 MIMO system with QPSK symbol modulation under the ITU Pedestrian A model with mobile velocities of 100 Km/Hr and 250 Km/Hr so that channel aliasing can be avoided. One OFDM symbol has 2048 subcarriers modulation and one packet (or frame) contains 24 OFDM symbols. This data transmission format reflects a possible 4G (4th Generation) physical data packet structure.

The existing Least Squares (LS) channel estimation uses two OFDM preambles to estimate the channel while the proposed channel estimation utilizes 64 impulse samples spanning over two OFDM symbols (using 64 samples for channel estimation). The total impulse power is set to be equal to the signal power, meaning that the actual data signal power is 3 dB less than the transmitted signal power.

The simulation result shows a clear advantage of the proposed channel algorithm over the conventional preamble-format channel estimation. It shows that the preamble-format channel estimation won't be a reliable method for a high Doppler channel environment unless additional training sequences are inserted throughout the packet to update channel estimates requiring further loss of bandwidth efficiency.

Contrary to that, note that the proposed channel estimation doesn't have any bandwidth loss since the impulse train is added to the data symbol in the transmitter and removed in the receiver as shown in the receiver structure.

This data transmission format reflects a possible 4G (4th Generation) physical data packet structure. The performance improvement of the proposed method under high Doppler environment has been shown in FIG. 7. Some flooring effect is observed in this Figure at high SNR. This flooring effect arises due to noise enhancement occurring at the tone location and due to the static channel assumption during the averaging process. Further signal processing techniques utilizing a decision feedback or cyclo-stationary wavelet forms could be pursued at the option of the system designer to improve the performance of the proposed channel estimation.

The proposed channel estimation can address the problem of a changing channel environment during the duration of an OFDM symbol effectively by performing an estimation during a fractional period of the whole data packet, thus enabling frequent channel updates. The proposed channel estimation avoids complex computation for multiple-antenna systems through the usage of an orthogonal zero-mean impulse train.

Rather than using a typical Kronecker Delta impulse train that could cause a Direct Current (DC) bias to the transmitted signal, the proposed estimation utilizes zero mean orthogonal Walsh impulse train. As a result, the impulse train used by one transmit antenna will be unique, and it minimizes interference with another transmit antenna during the channel estimation process.

The proposed channel estimation avoids the loss of bandwidth by adding the impulse train to the data symbol and later removing the impulse train before the data detection. In addition, by adding some impulse time jitter (thus making non-periodic), the proposed estimator could optionally further reduce the noise enhancement and data cancellation that has been a weakness of the original channel estimation by a periodic impulse train.

Those skilled in the art will appreciate that the FFT and IFFT shown in the Figures may be replaced with another type of Fourier Transform.

Although the invention has been described with respect to a limited number of embodiments, those skilled in the art will appreciate that other embodiments may be constructed within the spirit and scope of the following claims.

What is claimed is:

1. An apparatus comprising:
   a receiver configured to receive a signal; and
   a processor configured to:
   estimate a channel impulse response of the received signal,
   convolve said estimated channel impulse response with a scaled impulse train to form an estimated impulse train,
   subtract the estimated impulse train from the received signal to obtain an estimated received signal,
   perform a first Fourier transform on said estimated channel impulse response to obtain a transformed channel impulse response,
   perform a second Fourier transform on said estimated received signal to obtain a transformed estimated received signal, and
   generate an estimated data symbol based on said transformed channel impulse response and said transformed estimated received signal.

2. The apparatus according to claim 1, in which said channel impulse response is estimated by calculating a time average over a sample period that is less than or equal to a duration of a data symbol.

3. The apparatus according to claim 1, in which said impulse train comprises bipolar pulses having a zero mean property eliminating a DC bias of the received signal.

4. The apparatus according to claim 1, in which said impulse train is non-periodic, having a random time delay added to an input time.

5. An apparatus comprising:
   a receiver configured to receive a signal; and
   a processor configured to:
   estimate a channel impulse response of the received signal,
   perform a first Fourier transform on said estimated channel impulse response to obtain a transformed channel impulse response;
   perform a second Fourier transform on a scaled impulse train to obtain a transformed scaled impulse train;
   convolve said transformed channel impulse response and said transformed scaled impulse train to obtain an estimated impulse train;
   perform a Fourier transform on said received signal to obtain a transformed received signal,
   subtract the estimated impulse train from the transformed received signal to obtain a transformed estimated received signal, and
   generate an estimated data symbol based on said transformed channel impulse response and said transformed estimated received signal.

6. The apparatus according to claim 5, in which said channel impulse response is estimated by calculating a time average over a sample period that is less than or equal to a duration of a data symbol.

7. The apparatus according to claim 5, in which said impulse train comprises bipolar pulses having a zero mean property eliminating a DC bias of the received signal.

8. The apparatus according to claim 5, in which said impulse train is non-periodic, having a random time delay added to an input time.

9. A receiver comprising:
means for receiving a signal; and
processing means for estimating a channel impulse response of the received signal,
said processing means further for convolving the estimated channel impulse response with a scaled impulse train to form an estimated impulse train,
said processing means further for subtracting the estimated impulse train from the received signal to obtain an estimated received signal,
said processing means further for performing a first Fourier transform on said estimated channel impulse response to obtain a transformed channel impulse response,
said processing means further for performing a second Fourier transform on said estimated received signal to obtain a transformed estimated received signal, and
said processing means further for generating an estimated data symbol based on said transformed channel impulse response and said transformed estimated received signal.

10. The receiver of claim 9, wherein
the means for receiving comprises at least one receiver antenna,
the signal comprises an orthogonal frequency division multiplexed signal, and
the processing means comprises a digital signal processor.

11. A receiver comprising:
means for receiving a signal; and
processing means for estimating a channel impulse response of the received signal,
said processing means further for performing a first Fourier transform on said estimated channel impulse response to obtain a transformed channel impulse response,
said processing means further for performing a second Fourier transform on a scaled impulse train to obtain a transformed scaled impulse train,
said processing means further for convolving said transformed channel impulse response and said transformed scaled impulse train to obtain an estimated impulse train,
said processing means further for performing a third Fourier transform on said received signal to obtain a transformed received signal,
said processing means further for subtracting the estimated impulse train from the transformed received signal to obtain a transformed estimated received signal, and
said processing means further for generating an estimated data symbol based on said transformed channel impulse response and said transformed estimated received signal.

12. The receiver of claim 11, wherein
the means for receiving comprises at least one receive antenna,
the signal comprises an orthogonal frequency division multiplexed signal, and
the processing means comprises a digital signal processor.

13. A method comprising:
estimating, by a processor, a channel impulse response of a received signal;
convolving, by the processor, said estimated channel impulse response with a scaled impulse train to form an estimated impulse train;
subtracting, by the processor, the estimated impulse train from the received signal to obtain an estimated received signal;
performing, by the processor, a first Fourier transform on said estimated channel impulse response to obtain a transformed channel impulse response;
performing, by the processor, a second Fourier transform on said estimated received signal to obtain a transformed estimated received signal, and
generating, by the processor, an estimated data symbol based on said transformed channel impulse response and said transformed estimated received signal.

14. The method of claim 13, where estimating the received signal comprises calculating a time average over a sample period that is less than or equal to the duration of a data symbol.

15. The method of claim 13, wherein said impulse train comprises bipolar pulses having a zero mean property eliminating a DC bias of the received signal.

16. The method of claim 13, wherein said impulse train is non-periodic, having a random time delay added to an input time.

17. A method comprising:
estimating, by a processor, a channel impulse response of a received signal;
performing, by the processor, a first Fourier transform on said estimated channel impulse response to obtain a transformed channel impulse response;
performing, by the processor, a second Fourier transform on a scaled impulse train to obtain a transformed scaled impulse train;
convolving, by the processor, said transformed channel impulse response and said transformed scaled impulse train to obtain an estimated impulse train;
performing, by the processor, a third Fourier transform on said received signal to obtain a transformed received signal;
subtracting, by the processor, the estimated impulse train from the transformed received signal to obtain a transformed estimated received signal, and
generating, by the processor, an estimated data symbol based on said transformed channel impulse response and said transformed estimated received signal.

18. The method of claim 13, wherein estimating comprises calculating a time average over a sample period that is less than or equal to the duration of a data symbol.

19. The method of claim 13, wherein said impulse train comprises bipolar pulses having a zero mean property eliminating a DC bias of the received signal.

20. The method of claim 13, wherein said impulse train is non-periodic, having a random time delay added to an input time.

21. An apparatus according to claim 1, where said estimated data symbol comprises a first estimated data symbol, where said receiver is further configured to receive a second signal, and
where said processor is further configured to:
estimate a second channel impulse response of the second received signal,
convolve said second estimated channel impulse response with a second scaled impulse train to form a second estimated impulse train,
subtract the second estimated impulse train from the second received signal to obtain a second estimated received signal, perform a third Fourier transform on said second estimated channel impulse response to obtain a second transformed channel impulse response, perform a fourth Fourier transform on said second estimated received signal to obtain a second transformed estimated received signal, generate a second estimated data symbol based on said second transformed channel impulse response and said second transformed estimated received signal, and apply a multiple-input multiple-output detection process to said first estimated data symbol and said second estimated data symbol.

22. The apparatus according to claim 1, where said impulse train comprises an orthogonal impulse train having a zero mean property eliminating a DC bias of the received signal.

23. The apparatus according to claim 1, where said impulse train comprises a bipolar Walsh sequence impulse train.

24. The apparatus according to claim 1, where said received signal comprises an orthogonal frequency division multiplexed signal.

25. The apparatus according to claim 1, where said processor is configured to generate the estimated data symbol by performing per-tone equalization using said transformed channel impulse response and said transformed estimated received signal.

26. The apparatus according to claim 5, where said impulse train comprises an orthogonal impulse train having a zero mean property eliminating a DC bias of the received signal.

27. The apparatus according to claim 5, where said impulse train comprises a bipolar Walsh sequence impulse train.

28. The apparatus according to claim 5, where said received signal comprises an orthogonal frequency division multiplexed signal.

29. The apparatus according to claim 5, where said processor is configured to generate the estimated data symbol by performing per-tone equalization using said transformed channel impulse response and said transformed estimated received signal.

* * * * *